(12) United States Patent
Katsura et al.

(10) Patent No.: US 10,405,386 B2
(45) Date of Patent: Sep. 3, 2019

(54) LIGHT EMITTING ELEMENT DRIVING APPARATUS AND DRIVING METHOD THEREOF

(71) Applicant: Rohm Co., Ltd., Kyoto (JP)

(72) Inventors: Koji Katsura, Kyoto (JP); Ryosuke Kanemitsu, Kyoto (JP); Keisuke Miura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 4 days.

(21) Appl. No.: 15/956,911

(22) Filed: Apr. 19, 2018

(65) Prior Publication Data

US 2018/0317292 A1    Nov. 1, 2018

(30) Foreign Application Priority Data

Apr. 26, 2017 (JP) .................................. 2017086889

(51) Int. Cl.
*H05B 33/08* (2006.01)
(52) U.S. Cl.
CPC ..... *H05B 33/0821* (2013.01); *H05B 33/0818* (2013.01); *H05B 33/0827* (2013.01)
(58) Field of Classification Search
CPC ............ H05B 33/0818; H05B 33/0827; H05B 33/089; H05B 33/0812; H05B 33/0815; H05B 33/0845; H05B 33/0842; H05B 33/0851; H02M 3/156; H02M 2001/0009; G09G 3/3406; G09G 3/006; G09G 2330/12; G02F 1/133603; G02F 2001/133612

See application file for complete search history.

(56) References Cited

U.S. PATENT DOCUMENTS

| | | | | |
|---|---|---|---|---|
| 8,582,259 | B2 * | 11/2013 | Murakami | H03K 17/0822 361/56 |
| 8,754,579 | B2 * | 6/2014 | Kanemitsu | H05B 33/0818 315/119 |
| 10,075,073 | B2 * | 9/2018 | Guan | H02M 3/158 |

FOREIGN PATENT DOCUMENTS

JP    2013-89570    5/2013

* cited by examiner

*Primary Examiner* — Haissa Philogene
(74) *Attorney, Agent, or Firm* — Fish & Richardson P.C.

(57) ABSTRACT

A light emitting element driving apparatus includes the following: current source; error amplifier generating error signal based on comparison of a first reference voltage with the highest voltage among total forward drop voltages of element arrays or feedback voltage corresponding to a drive voltage; first and second switches for ON/OFF control to apply the feedback voltage to first and second input terminals of the error amplifier respectively; slope voltage generating circuit; PWM comparator generating a pulse modulation signal; drive amplifier controlled by the pulse modulation signal and drives a switching element supplying the drive voltage to the element arrays; PWM width detector that outputs a pulse width detection signal having different levels between when the pulse width is less than predetermined threshold value and when equal to or greater than the threshold value, and switches ON/OFF of the first and second switches based on the pulse width detection signal.

19 Claims, 7 Drawing Sheets

| | Circuit part/circuit function | First feedback control mode<br>ON width<Threshold value | Second feedback control mode<br>ON width≥Threshold value |
|---|---|---|---|
| (a) | Relationship between ON width of dimming signal PWM and threshold value | | |
| (b) | Dimming signal width detection signal PWM_WDET | Low level L | High level H |
| (c) | Switch SW1 | ON | OFF |
| (d) | Switch SW2 | OFF | ON |
| (e) | Voltage feedback by FB (for error amplifier 8) | Present | Absent |
| (f) | Feedback of VLED1~VLED4 (for error amplifier 8) | Absent | Present |
| (g) | Control by LSDET1 | Disable | Enable |
| (h) | Control by LSDET2 | Disable | Enable |
| (i) | Vslope control (slope offset adjuster 15) | ON | OFF |

LIGHT EMITTING ELEMENT DRIVING APPARATUS AND DRIVING METHOD THEREOF

CROSS-REFERENCE TO RELATED APPLICATION

This application is based upon and claims the benefit of priority from Japanese Patent Application No. 2017-086889, filed on Apr. 26, 2017, the entire contents of which are incorporated herein by reference.

TECHNICAL FIELD

The present disclosure relates to a light emitting element driving apparatus and a driving method thereof.

BACKGROUND

In the related art, various light emitting element driving apparatuses for driving light emitting elements such as light emitting diodes (LEDs) have been developed.

Recently, in-vehicle displays, which are display devices mounted on vehicles, are in widespread use. In such in-vehicle displays, it is necessary to change luminance between a vehicle traveling during the daytime and a vehicle traveling during the nighttime or in a tunnel. Specifically, it is necessary to increase the luminance during the daytime traveling and to decrease the luminance during the nighttime or tunnel traveling. In particular, the capability to adjust the luminance to a lower level is required in order to cope with users (such as westerners) who have pale pupil color.

For example, a dimming ratio (=maximum luminance: minimum luminance) of an LED included in a backlight device provided on an in-vehicle display is required to be, e.g., 20,000:1. For example, when the LED is rapidly dimmed, a problem such as instantaneous flickers may occur in the LED.

In addition, the number of LED light sources used for vehicles is increasing year by year, and electric heating lamps have been replaced in the related art. However, as the electric heating lamps are replaced by the LEDs, there has been a concern of malfunctions such as instantaneous flickering that has not been a problem in the past.

Instantaneous flickering of an LED is disclosed in the related art. In the related art, a technique includes a power supply line connected to a power terminal, a light emitting diode inserted into the power supply line, a switch connected to the power supply line at a downstream side of the light emitting diode to switch ON/OFF of the light emitting diode, a capacitor connected in parallel to the switch, a bypass line for bypassing the light emitting diode between the power terminal and the switch, a bypass line for bypassing the light emitting diode between the power terminal and the switch, and a switching part for selectively switching a supply source of electric power input to the power terminal to the power supply line or the bypass line. The switching part connects the power terminal and the bypass line when the light emitting diode is turned off. With this configuration, countermeasures for instantaneous flickering when an LED is turned on or turned off are taken.

Figure 6:
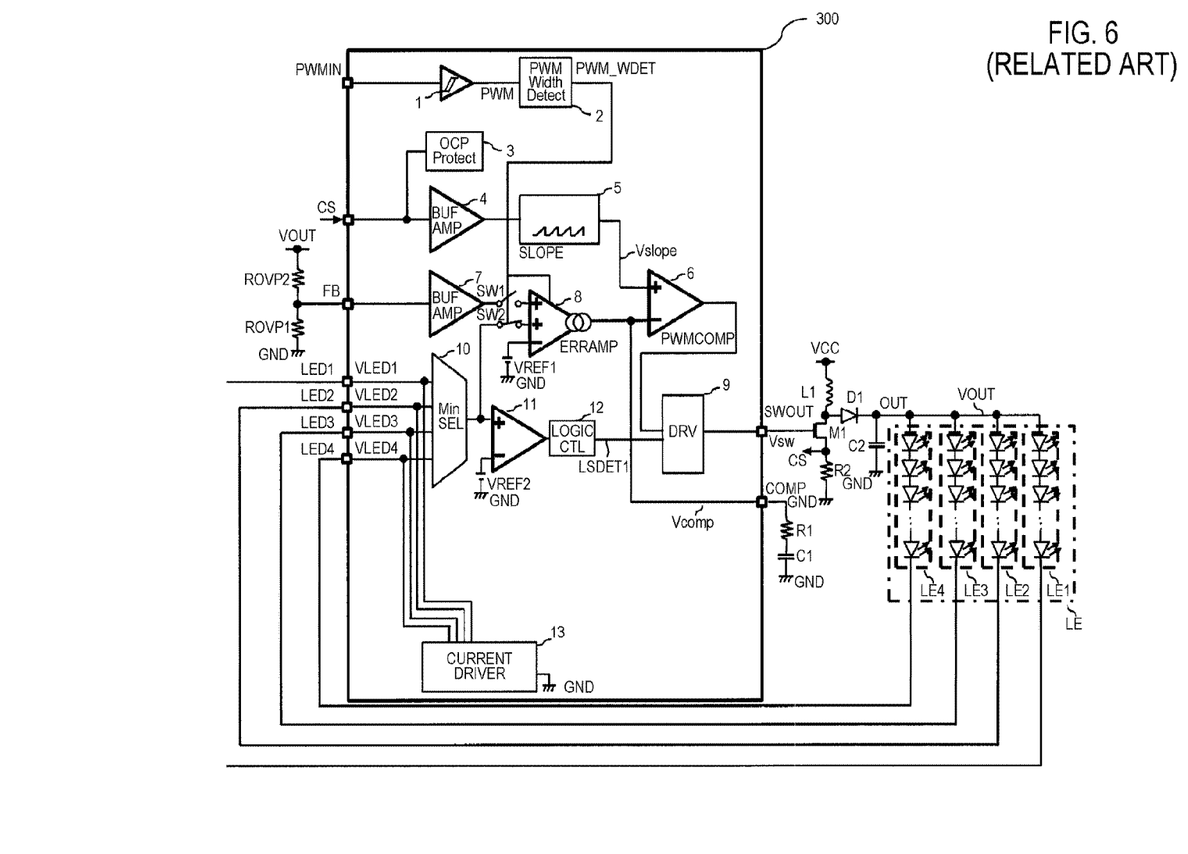
FIG. 6 illustrates a block diagram of a light emitting element driving circuit which has been reviewed in advance by the present inventor, in proposing a light emitting element driving circuit according to the present disclosure.

FIG. 6 illustrates a configuration of a light emitting element driving apparatus LED driver IC 300 which has been reviewed in advance by the present inventor concerning a malfunction such as instantaneous flickering.

An output stage of the light emitting element driving apparatus installed outside the LED driver IC 300 has a switching element M1, a rectifying diode D1, a coil L1, an output capacitor C2, and a resistor R2. A well-known switching power source is constituted by a circuit configuration of these elements, and a PWM comparator, an error amplifier, a drive amplifier and the like which will be described later.

The LED driver IC 300 includes a Schmitt trigger 1, a PWM width detector 2, an overcurrent protection circuit 3, a buffer amplifier 4, a slope voltage generating part 5, a PWM comparator 6, a buffer amplifier 7, an error amplifier 8, a drive amplifier 9, an LED voltage selector 10, a comparator 11, a logic circuit 12, a constant current source 13, a switch SW1, and a switch SW2, and is configured by integrating them. In addition, the LED driver IC 300 has terminals PWMIN, CS, FB, LED1 to LED4, SWOUT, and COMP for establishing electrical connection with the outside.

A power source voltage VCC is connected to one end of the coil L1, and a drain of the switching element M1 formed of an n-channel MOSFET and an anode of the rectifying diode D1 are connected to the other end of the coil L1. A source of the switching element M1 is connected to one end of the resistor R2. The other end of the resistor R2 is connected to a ground potential GND. A gate of the switching element M1 is connected to the switching terminal SWOUT of the LED driver IC 300. One end of the output capacitor C2 is commonly connected to a cathode of the rectifying diode D1, and the other end thereof is connected to the ground potential GND. The common connection point corresponds to an output terminal OUT. An output voltage VOUT is generated at the output terminal OUT. Respective anodes of element arrays LE1, LE2, LE3, and LE4 in which a plurality of light emitting elements are connected in series are commonly connected to the output terminal OUT. The element arrays LE1, LE2, LE3, and LE4 constitute one light emitting element light source LE.

The output voltage VOUT is supplied as a driving voltage for driving the light emitting element light source LE. Voltage dividing resistors ROVP2 and ROVP1 are connected in series between the output terminal OUT and the ground potential GND. A connection point between the resistors ROVP2 and ROVP1 is connected to the buffer amplifier 7 via the feedback terminal FB of the LED driver IC 300. An output of the buffer amplifier 7 is connected to a first non-inverting input terminal (+) of the error amplifier 8 via the switch SW1.

Respective cathodes of the element arrays LE1 to LE4 are connected to the LED voltage selector 10 and the constant current source 13 via the LED connection terminals LED1 to LED4 of the LED driver IC 300.

An output of the LED voltage selector 10 is connected to one end of the switch SW2 and a non-inverting input terminal (+) of the comparator 11.

The other end of the switch SW2 is connected to a second non-inverting input terminal (+) of the error amplifier 8. A first reference voltage VREF1 is connected to an inverting input terminal (−) of the error amplifier 8. A second reference voltage VREF2 is connected to an inverting input terminal (−) of the comparator 11. The second reference voltage VREF2 is set slightly higher than the first reference voltage VREF1.

The error amplifier 8 amplifies a difference between one of a feedback voltage Vfb obtained by dividing the output voltage VOUT by the resistor ROVP2 and the resistor ROVP1 and an output voltage of the LED voltage selector 10 and the first reference voltage VREF1 to generate an error voltage Vcomp, and is connected to an inverting input terminal (−) of the PWM comparator 6 and the error amplifier output terminal COMP of the LED driver IC 300. One end of the resistor R1 is connected to the error amplifier output terminal COMP of the LED driver IC 300, the other end of the resistor R1 is connected to one end of the capacitor C1, and the other end of the capacitor C1 is connected to the ground potential GND. A phase characteristic of the LED driver IC 300 is set by the resistor R1 and the capacitor C1.

The LED voltage selector 10 outputs the lowest voltage with respect to the ground potential GND among the voltages VLED1 to VLED4 of the LED connection terminals LED1 to LED4. In other words, it outputs the highest voltage (the largest voltage) of light emitting element drop voltages VLD which are drop voltages in the element arrays LE1 to LE4.

The comparator 11 compares the output voltage of the LED voltage selector 10 with the second reference voltage VREF2 to output the comparison result to the logic circuit 12.

The logic circuit 12 receives the output of the comparator 11, and outputs a first control signal LSDET1 after processing in the logic. The first control signal LSDET1 controls switching of the switching element M1 via the drive amplifier 9 so that each of the voltages VLED1 to VLED4 of the LED connection terminals LED1 to LED4 does not decrease.

A connection point between the source of the switching element M1 and one end of the resistor R2 is connected to the overcurrent protection circuit 3 and the buffer amplifier 4 via the protection input terminal CS of the LED driver IC 300. The overcurrent protection circuit 3 forcibly turns off the switching element M1 when a coil current flowing through the coil L1 reaches a predetermined overcurrent set value. An output of the buffer amplifier 4 is input to the slope voltage generating part 5. The slope voltage generating part 5 generates a sawtooth-shaped or triangular wave slope voltage Vslope. The slope voltage Vslope is connected to a non-inverting input terminal (+) of the PWM comparator 6. The PWM comparator 6 compares the error voltage of the error amplifier 8 with the slope voltage Vslope to output the comparison result to the drive amplifier 9.

The drive amplifier 9 controls the gate of the switching element M1 via the switching terminal SWOUT of the LED driver IC 300 based on the comparison result of the PWM comparator 6.

A pulsed PWM signal is input from a signal source (not shown) to the terminal PWMIN of the LED driver IC 300. The input PWM signal passes through the Schmitt trigger 1 which generates a dimming signal PWM and inputs the same to the PWM width detector 2. The PWM width detector 2 measures an ON width of the input dimming signal PWM, and outputs a high level H when it is equal to or greater than a threshold value and outputs a low level L as a dimming signal width detection signal PWM_WDET when it is less than the threshold value. The dimming signal width detection signal PWM_WDET is connected to the switch SW1, the switch SW2, and the error amplifier 8 to switch (ON/OFF) each of the switches, SW1 and SW2. The error amplifier 8 is always turned on when the switch SW1 is turned on, and operates synchronously with PWM when the switch SW2 is turned on.

In reviewing the LED driver 300, the present inventor attempted to develop a method of switching between two modes, namely a first feedback control mode and a second feedback control mode, depending on the ON width of the dimming signal PWM. That is, when the ON width of the dimming signal PWM is less than a threshold value, the switch SW1 is turned on and the switch SW2 is turned off, and the first feedback control mode is enabled. When the ON width of the dimming signal PWM is equal to or greater than the threshold value, the switch SW1 is turned off and the switch SW2 is turned on, and the second feedback control mode is enabled.

The reasons for adopting the first feedback control mode and the second feedback control mode are as follows.

When controlling is performed only in the first feedback control mode, it is necessary to set the output voltage VOUT equal to or higher than a specified value because it cannot be specified how much the light emitting element drop voltage VLD is generated in the light emitting element light source LE, and the voltage applied to the light emitting element light source LE becomes larger, increasing heat generation.

In addition, when controlling is performed only in the second feedback control mode, when a PWM pulse width becomes narrower, the time for switching the switching element M1 becomes shorter, energy cannot be accumulated in the coil, and the output voltage VOUT gradually decreases, making it impossible to supply a sufficient voltage to the light emitting element light source LE.

Further, even when both the first feedback control mode and the second feedback control mode are used, it was also recognized that the above malfunction cannot be solved when such combination is released, i.e., when the second feedback control mode is adopted when the ON width of the dimming signal PWM is less than the threshold value, and the first feedback control mode is adopted when the ON width of the dimming signal PWM is greater than the threshold value.

When the switch SW1 is turned on and the switch SW2 is turned off, the feedback voltage Vfb obtained by dividing the output voltage VOUT by the resistor ROVP2 and the resistor ROVP1 is input to the error amplifier 8. Therefore, the first feedback control mode in which the feedback voltage Vfb is used as a feedback signal is performed, and the output voltage VOUT is controlled to be constant.

On the other hand, when the switch SW1 is turned off and the switch SW2 is turned on, the minimum voltage on the cathode side with respect to the ground potential GND among the voltages VLED1 to VLED4 of the LED connection terminals LED1 to LED4 is input to the error amplifier 8. Therefore, the feedback control in which the minimum voltage on the cathode side of the element arrays LE1 to LE4 is used as the feedback signal is performed. A control method for controlling the output voltage VOUT based on the minimum voltage on the cathode side of the element arrays LE1 to LE4 is the second feedback control mode of the present disclosure.

By combining the first feedback control mode and the second feedback control mode, the dimming of the element arrays LE1 to LE4 corresponding to a duty of the dimming signal PWM can be performed.

Figure 7:
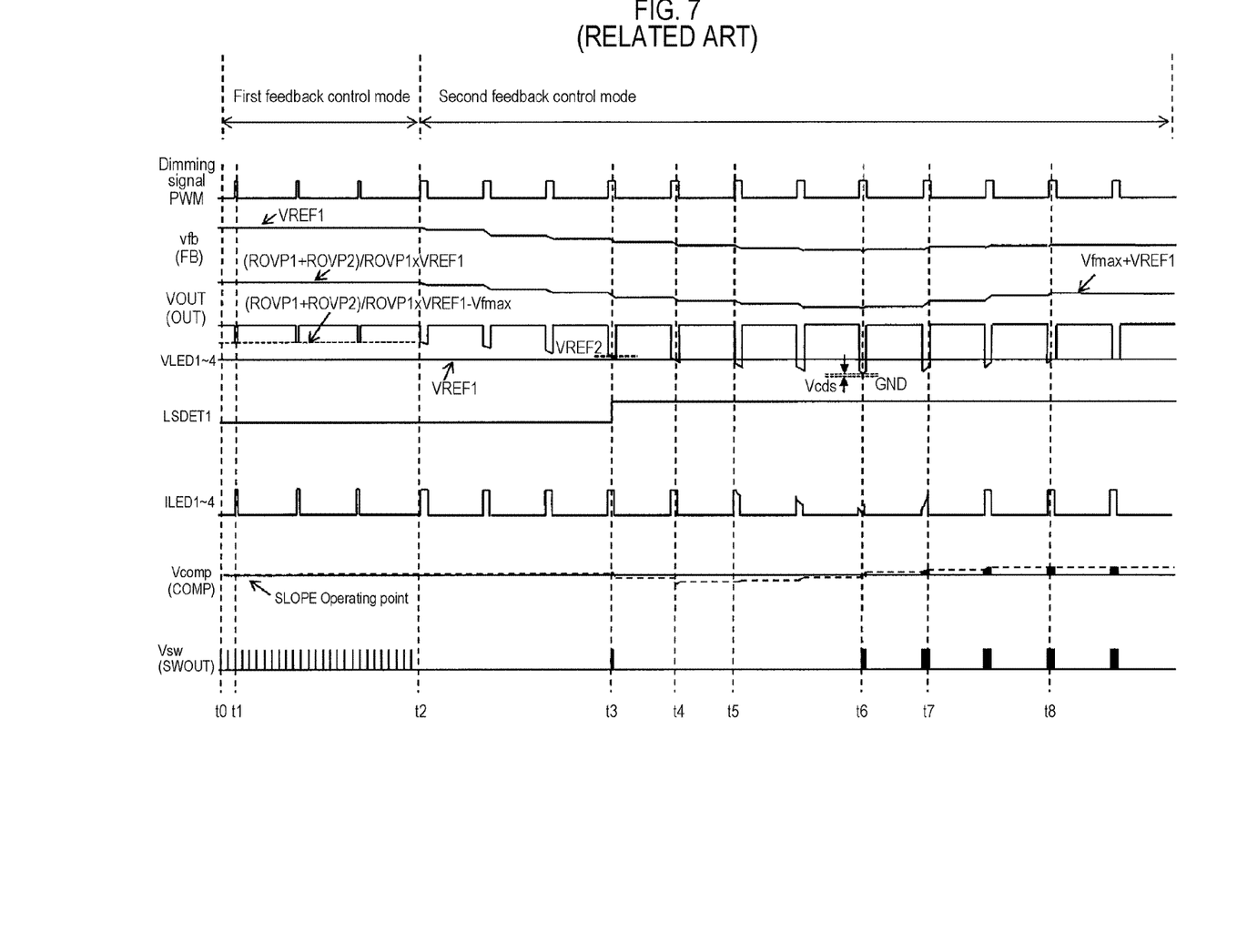
FIG. 7 is a timing chart when switching between the first feedback control mode and the second feedback control mode in FIG. 6.

FIG. 7 is a diagram illustrating a malfunction existing in the LED driver IC 300 illustrated in FIG. 6. FIG. 7 illustrates a timing chart when switching from a first feedback control mode to a second feedback control mode.

The dimming signal PWM indicates a state (first feedback control mode) in which the ON width of the dimming signal PWM is less than a threshold value of the dimming signal width detection signal PWM_WDET from time t0 to time t2, and indicates a state (second feedback control mode) in which the ON width of the dimming signal PWM is equal to or greater than the threshold value of the dimming signal width detection signal PWM_WDET after time t2.

The feedback voltage Vfb generated at the feedback terminal FB of the LED driver IC 300 is controlled in the first feedback control mode from the time t0 to the time t2. After the time t2, the feedback voltage Vfb is not controlled. After the time t2, the second feedback control mode is performed.

The output voltage VOUT has a value expressed by the following equation from the time t0 to the time t2.

$$VOUT=(ROVP1+ROVP2)/ROVP1*VREF1$$

In the above equation, the resistor ROVP1 and the resistor ROVP2 are external resistors of the feedback terminal FB, and the first reference voltage VREF1 is a voltage generated in the LED driver IC 300.

A period from the time t2 to time t8 is a transient period before the output voltage VOUT is kept at a predetermined magnitude, and for example, at time t6, a potential difference between the minimum voltage of each of the voltages VLED1 to VLED4 of the LED connection terminals LED1 to the LED4 and the ground potential GND is indicated by Vcd5, which is lower than the first reference voltage VREF1 and does not become a sufficient voltage source for driving the constant current source 13. Therefore, a predetermined current cannot be supplied to the light emitting element light source LE. After the time t8, it is a value expressed by the following equation. Here, Vfmax indicates the largest light emitting element drop voltage VLD among the element arrays LE1 to LE4.

$$VOUT=Vfmax+VREF1$$

Each of the voltages VLED1 to VLED4 of the LED connection terminals LED1 to LED4 when the dimming signal PWM has a low level L is expressed by the following equation from the time t0 to the time t2.

$$VLED1\ to\ VLED4=(ROVP1+ROVP2)/ROVP1*VREF1$$

At the time t1 when the LED is turned on, it is expressed by the following equation.

$$VLED1\ to\ VLED4=(ROVP1+ROVP2)/ROVP1*VREF1-Vfmax$$

Each of the voltages VLED1 to VLED4 of the LED connection terminals LED1 to LED4 corresponds to a transient period before it is kept at a predetermined magnitude from the time t2 to the time t8. Each of the voltages VLED1 to VLED4 of the LED connection terminals LED1 to LED4 is controlled to be the first reference voltage VREF1 at the time t8.

The first control signal LSDET1 indicates a low level L from the time t0 to the time t3. When each of the voltages VLED1 to VLED4 of the LED connection terminals LED1 to LED4 becomes equal to or lower than the second reference voltage VREF2 at the time t3, it is output as a high level H. The second reference voltage VREF2 is set slightly higher than the first reference voltage VREF1. The first control signal LSDET1 serves as an enable signal for switching the switching element M1 in the second feedback control mode. In the second feedback control mode, the LED driver IC 300 allows switching of the switching element M1 when the dimming signal PWM has a high level H and the first control signal LSDET1 has a high level H.

Respective currents ILED1 to ILED4 of the connection terminals LED1 to LED4 are stably supplied from the time t0 to the time t5. However, from the time t5 to the time t7 when each of the voltages VLED1 to VLED4 of the LED connection terminals LED1 to LED4 is low, the constant current source 13 deviates from a proper operation range, making it impossible to stably supply each of the currents ILED1 to ILED4 that should be supplied to the element arrays LE1 to LE4. In particular, at the time t6, the potential Vcd5 as a voltage source to be supplied to the constant current source 13 as described above becomes extremely small and a predetermined current cannot be supplied to the element arrays LE1 to LE4. Thus, a malfunction such as so-called instantaneous flickering occurs. Thereafter, each of the currents ILED1 to ILED4 is stably supplied at the time t8.

The voltage Vcomp of the error amplifier output terminal COMP of the LED driver IC 300 is a voltage output from the error amplifier 8. At the times t0 to t2 when it operates in the first feedback control mode, when the currents ILED1 to ILED4 of the connection terminals LED1 to LED4 are averaged, the voltage is small and relatively low (close to the slope voltage) to be able to switch asynchronously with the dimming signal PWM.

The voltage Vcomp of the error amplifier output terminal COMP of the LED driver IC 300 is kept as a voltage at which the error amplifier 8 goes to a high impedance state from the time t2 to the time t3 when each of the voltages VLED1 to VLED4 of the LED connection terminals LED1 to LED4 becomes equal to or lower than the second reference voltage VREF2.

By allowing each of the voltages VLED1 to VLED4 of the LED connection terminals LED1 to LED4 to become equal to or lower than the first reference voltage VREF1 at the time t4, the voltage Vcomp of the error amplifier output terminal COMP of the LED driver IC 300 starts to be charged.

The voltage Vcomp of the error amplifier output terminal COMP of the LED driver IC 300 is charged up to the slope voltage or more at the time t6.

The charging of the voltage Vcomp of the error amplifier output terminal COMP of the LED driver IC 300 is completed after the time t8.

The switching voltage Vsw is output to the switching terminal SWOUT to drive the switching element M1. The switching element M1 is switched off when the voltage of the feedback terminal FB exceeds the first reference voltage VREF1 at the times t0 to t2, and the switching element M1 is switched on and operates asynchronously with the dimming signal PWM when the voltage is lower than the first reference voltage VREF1.

When the width of the dimming signal PWM exceeds a predetermined threshold value at the time t2, the switching is made from the first feedback control mode to the second feedback control mode. Each of the voltages VLED1 to VLED4 of the LED connection terminals LED1 to LED4 gradually decreases, and the switching element M1 is switched off before the voltage becomes equal to or lower than the second reference voltage VREF2.

By allowing each of the voltages VLED1 to VLED4 of the LED connection terminals LED1 to LED4 to become equal to or lower than the second reference voltage VREF2 at the time t3, the first control signal LSDET1 becomes a high level and the switching element M1 of the LED driver IC 300 is switched on.

Since the voltage Vcomp of the error amplifier output terminal COMP of the LED driver IC 300 is lower than the originally required operating point from the time t4 to the time t6, the switching element M1 of the LED driver IC 300 is not switched on.

By allowing each of the voltages VLED1 to VLED4 of the LED connection terminals LED1 to LED4 to become equal to or lower than the first reference voltage VREF1 at the time t4, the voltage Vcomp of the error amplifier output terminal COMP of the LED driver IC 300 starts to be charged. Thus, the voltage Vcomp of the error amplifier output terminal COMP of the LED driver IC 300 is charged up to the operating region at the time t6, and the switching element M1 of the LED driver IC 300 is switched on.

In a method of the related art, countermeasures are taken at the time of turning on and off, but nothing is disclosed about instantaneous flickering at the time of dimming.

In addition, it was found that the circuit of FIG. 6 which has been reviewed in advance before the present disclosure cannot stably supply the LED driving current from the time t5 to the time t7 in FIG. 7. Since this causes the voltage Vcomp of the error amplifier output terminal COMP to become lower than the slope voltage Vslope at the times t4 to t6 in FIG. 7, the switching element M1 cannot be sufficiently switched and each of the voltages VLED1 to VLED4 of the LED connection terminals LED1 to LED4 decreases and an appropriate voltage cannot be supplied to the constant current source 13. Therefore, an instantaneously flicker malfunction in the LED1 to LED4 was found.

SUMMARY

Some embodiments of the present disclosure provide prevention of instantaneous flickering at the time of dimming in a light emitting element driving apparatus.

According to one embodiment of the present disclosure, a light emitting element driving apparatus includes: (a) a current source configured to supply a current to each of a plurality of element arrays in which a plurality of light emitting elements are connected in series; (b) an error amplifier configured to generate an error signal based on a comparison of a first reference voltage with one of the highest voltage among total forward drop voltages of the plurality of element arrays, and a feedback voltage corresponding to a drive voltage supplied to the plurality of element arrays; (c) a first switch configured to perform an ON/OFF control to apply the feedback voltage to a first input terminal of the error amplifier or not to apply the feedback voltage to the first input terminal; (d) a second switch configured to perform an ON/OFF control to apply the highest voltage among the total forward drop voltages to a second input terminal of the error amplifier or not to apply the highest voltage to the second input terminal; (e) a slope voltage generating circuit configured to generate a slope voltage; (f) a PWM comparator configured to generate a pulse modulation signal having a duty ratio based on the slope voltage and the error signal; (g) a drive amplifier that is controlled by the pulse modulation signal output from the PWM comparator and drives a switching element configured to supply the drive voltage to the plurality of element arrays; and (h) a PWM width detector configured to detect a pulse width of the pulse modulation signal, (i) wherein the PWM width detector outputs a pulse width detection signal having different levels between when the pulse width of the pulse modulation signal is less than a predetermined threshold value and when the pulse width is equal to or greater than the threshold value, and switches ON/OFF of the first switch and the second switch based on the pulse width detection signal In some embodiments of the present disclosure, when the pulse width of the pulse modulation signal is less than the threshold value, the first switch and the second switch are turned on and turned off, respectively, and when the pulse width of the pulse modulation signal is equal to or greater than the threshold value, the first switch and the second switch are turned off and turn on, respectively.

In some embodiments of the present disclosure, a DC potential of the slope voltage generated by the slope voltage generating circuit is switched depending on whether the pulse width of the pulse modulation signal is less than the threshold value or the pulse width is equal to or greater than the threshold value.

In some embodiments of the present disclosure, the slope voltage generating circuit is controlled by a slope offset adjuster that is turned on or off by the pulse width detection signal, and the DC potential of the slope voltage is adjusted depending on whether the slope offset adjuster is turned on or turned off.

In some embodiments of the present disclosure, when the pulse width of the pulse modulation signal is less than the threshold value, the DC potential of the slope voltage is controlled to be higher than the DC potential when the pulse width of the pulse modulation signal is equal to or greater than the threshold value.

In some embodiments of the present disclosure, the slope offset adjuster includes an operational amplifier, a transistor, a first resistor, and a current mirror circuit, wherein a voltage source is connected to a non-inverting input terminal of the operational amplifier, wherein a control electrode of the transistor is connected to an output terminal of the operational amplifier, wherein an inverting input terminal of the operational amplifier is commonly connected to a first main electrode of the transistor, wherein the first resistor is connected between the first main electrode of the transistor and a ground potential, wherein an input stage of the current mirror circuit is connected to a second main electrode of the transistor, wherein an output stage of the current mirror circuit is connected to one end of a second resistor, wherein the other end of the second resistor is coupled to the slope voltage, and wherein the DC potential of the slope voltage is dependent on a magnitude of a current flowing between the first main electrode and the second main electrode of the transistor.

In some embodiments of the present disclosure, the error amplifier, the PWM comparator, and the slope offset adjuster are incorporated in a single semiconductor integrated circuit (IC), and an output of the error amplifier is connected to one input terminal of the PWM comparator and led out to a first external terminal of the semiconductor integrated circuit.

In some embodiments of the present disclosure, a series connection body of a resistor and a capacitor, which are formed of separate parts, is connected between the first external terminal and the ground potential.

In some embodiments of the present disclosure, the apparatus further includes: a first comparator configured to output, as a first comparison output signal, a comparison of the highest voltage among the total forward drop voltages of the plurality of element arrays with a second reference voltage to output a comparison of the highest voltage with the second reference voltage, as a first comparison output signal; a second comparator configured to output, as a second comparison output signal, a comparison of the highest voltage with a third reference voltage; and a logic part configured to respectively generate a first control signal and a second control signal for controlling ON/OFF of the switching element via the drive amplifier based on the first comparison output signal and the second comparison output signal.

In some embodiments of the present disclosure, the first control signal is enabled when the highest voltage among the total forward drop voltages of the plurality of the element arrays exceeds the second reference voltage for the first time after the pulse width of the pulse modulation signal detected by the PWM width detector exceeds the threshold, the second control signal is enabled each time the highest voltage exceeds the third reference voltage, and the switching of the switching element being allowed when both the first control signal and the second control signal are enabled.

In some embodiments of the present disclosure, a relationship of REF1<VREF2<VREF3 is established among the first reference voltage, the second reference voltage, and the third reference voltage, wherein the first reference voltage is VREF1, the second reference voltage is VREF2 and the third reference voltage is VREF3.

In some embodiments of the present disclosure, the current source is of a sink current type provided between cathode sides of the element arrays and the ground potential.

In some embodiments, the current source is of a source current type that supplies a current from the drive voltage side to anode sides of the element arrays.

In some embodiments of the present disclosure, the current mirror circuit is in an ON state when the pulse width of the pulse modulation signal is less than the threshold value, and is in an OFF state when the pulse width of the pulse modulation signal is equal to or greater than the threshold value.

According to another embodiment of the present application, there is provided a method of driving the light emitting element driving, when the pulse width of the pulse modulation signal is less than the threshold value, a first feedback control mode in which the feedback voltage and the first reference voltage are compared is set and the drive voltage is controlled to be a predetermined magnitude, and when the pulse width of the pulse modulation signal is equal to or greater than the threshold value, a second feedback control mode in which a magnitude of the drive voltage is controlled based on the highest voltage among the total forward drop voltages of the plurality of element arrays is set.

In some embodiments of the present disclosure, when the first feedback control mode is set, the first switch is turned on and the second switch is turned off, switching control of the switching element by the first control signal and the second control signal is released, and the DC potential of the slope voltage is controlled.

In some embodiments of the present disclosure, when the second feedback control mode is set, the first switch is turned off and the second switch is turned on, switching control of the switching element by the first control signal and the second control signal is executed and the control of the DC potential of the slope voltage is interrupted.

DETAILED DESCRIPTION

Embodiments of the present disclosure will now be described with reference to the drawings.

Figure 1:
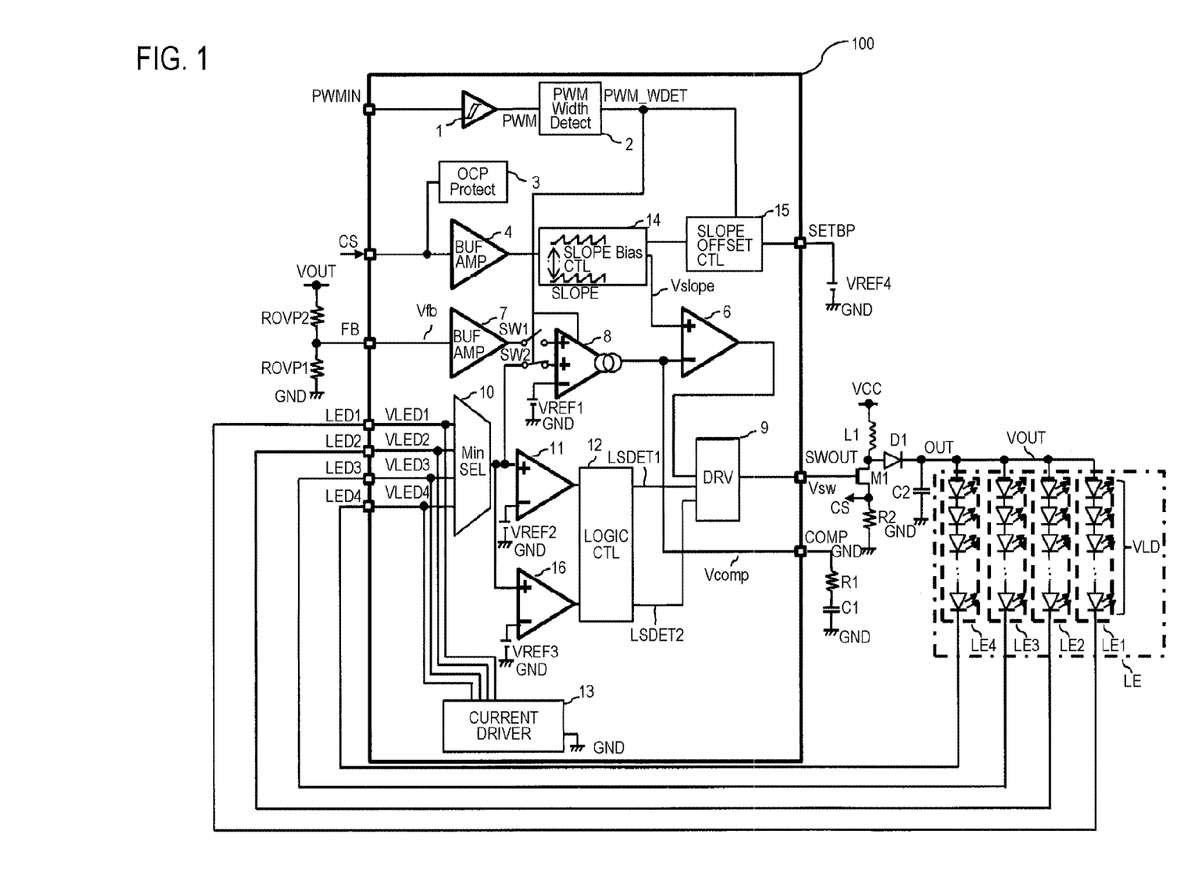
FIG. 1 is a block diagram illustrating an example of a configuration of the present disclosure.

FIG. 1 is a block diagram illustrating an example of a configuration of the present disclosure. The parts having the same functions as those in FIG. 6 are given like reference numerals. The major difference of FIG. 1 from FIG. 6 is that it includes a slope voltage control part 14, a slope offset adjuster 15, a comparator 16, and a voltage setting terminal SETBP.

An output stage installed outside an LED driver IC 100 has a switching element M1, a rectifying diode D1, a coil L1, an output capacitor C2, and a resistor R2. A well-known switching power source is constituted by these elements, and a circuit configuration of a PWM comparator, an error amplifier, a drive amplifier and the like which will be described later.

The LED driver IC 100 includes a Schmitt trigger 1, a PWM width detector 2, an overcurrent protection circuit 3, a buffer amplifier 4, a slope voltage control part 14, a slope offset adjuster 15, a PWM comparator 6, a buffer amplifier 7, an error amplifier 8, a drive amplifier 9, an LED voltage selector 10, a comparator 11, a logic circuit 12, a constant current source 13, a comparator 16, a switch SW1 and a switch SW2, and is configured by integrating them. In addition, the LED driver IC 100 includes terminals PWMIN, CS, FB, LED1 to LED4, SWOUT, COMP, and SETBP for establishing electrical connection with the outside.

A power source voltage VCC is connected to one end of the coil L1, and a drain of the switching element M1 formed of an n-channel MOSFET and an anode of the rectifying diode D1 are connected to the other end thereof. A source of the switching element M1 is connected to one end of the resistor R2. The other end of the resistor R2 is connected to a ground potential GND. A gate of the switching element M1 is connected to the switching terminal SWOUT of the LED driver IC 100. One end of the output capacitor C2 is commonly connected to a cathode of the rectifying diode D1, and the other end thereof is connected to the ground potential GND. The common connection point corresponds to an output terminal OUT. An output voltage VOUT is generated at the output terminal OUT. Respective anodes of element arrays LE1, LE2, LE3, and LE4 in which a plurality of light emitting elements are connected in series are commonly connected to the output terminal OUT. The element arrays LE1, LE2, LE3, and LE4 constitute one light emitting element light source LE.

A connection point between the source of the switching element M1 and one end of the resistor R2 is connected to the overcurrent protection circuit 3 and the buffer amplifier 4 via the protection input terminal CS of the LED driver IC 100. The overcurrent protection circuit 3 forcibly turns off the switching element M1 when a coil current flowing through the coil L1 reaches a predetermined overcurrent set value. An output of the buffer amplifier 4 is input to the slope voltage control part 14. The slope voltage control part 14 generates a sawtooth-shaped or triangular-wave slope voltage Vslope. The slope voltage control part 14 is controlled by the slope offset adjuster 15 controlled by a value of a voltage source VREF4 connected to the voltage setting terminal SETBP of the LED driver IC 100.

The output voltage VOUT is used as a driving voltage for driving the light emitting element light source LE. A resistor ROVP2 and a resistor ROVP1 for dividing the output voltage VOUT are connected in series between the output terminal OUT and the ground potential GND. A connection point between the resistor ROVP2 and the resistor ROVP1 is connected to the buffer amplifier 7 via the feedback terminal FB of the LED driver IC 100. An output of the buffer amplifier 7 is connected to a first non-inverting input terminal (+) of the error amplifier 8 via the switch SW1.

Each of the cathodes of the element arrays LE1 to LE4 is connected to the LED voltage selector 10 and the constant current source 13 via the LED connection terminals LED1 to LED4 of the LED driver IC 100.

The constant current source 13 is disposed between the LED connection terminals LED1 to LED4 and the ground potential GND, and generates a well-known sink current. The constant current source 13 may also be configured to generate a so-called source current, which is disposed on the anode side of the light emitting element (LED) connected to the output terminal OUT among the element arrays LE1 to LE4, without generating the sink current. In any case, the drop voltage of an element array having the largest light emitting element drop voltage VLD among the element arrays LE1 to LE4 is selected and output by the LED voltage selector 10.

The error amplifier 8 amplifies a difference between one of a feedback voltage Vfb obtained by dividing the output voltage VOUT by the resistor ROVP2 and the resistor ROVP1 and an output voltage of the LED voltage selector 10, and a first reference voltage VREF1 to output an error voltage Vcomp and transmit the same to an inverting input terminal (−) of the PWM comparator 6 and the error amplifier output terminal COMP of the LED driver IC 100. One end of the resistor R1 is connected to the error amplifier output terminal COMP installed outside the LED driver IC 100, the other end of the resistor R1 is connected to one end of the capacitor C1, and the other end of the capacitor C1 is connected to the ground potential GND. A phase characteristic of the LED driver IC 100 is set by the resistor R1 and the capacitor C1. The resistor R1 and the capacitor C1 determine the phase characteristic of the LED driver IC 100 and also determine a voltage gain of the error amplifier 8. By forming the resistor R1 and the capacitor C1 by the external elements of the LED driver IC 100, the adjustment of such phase characteristics and voltage gain can be facilitated. Further, the external elements are capable of eliminating a deviation of resistance value and capacitance value occurring in the LED driver IC 100 and an influence of the temperature dependence.

The output of the LED voltage selector 10 is connected to one end of the switch SW2, the non-inverting input terminal (+) of the comparator 11, and the non-inverting input terminal (+) of the comparator 16.

The other end of the switch SW2 is connected to a second non-inverting input terminal of the error amplifier 8. The first reference voltage VREF1 is connected to the inverting input terminal of the error amplifier 8. A second reference voltage VREF2 is connected to the inverting input terminal (−) of the comparator 11.

The LED voltage selector 10 outputs the lowest voltage with respect to the ground potential GND among the cathode voltages VLED1 to VLED4 of the element arrays LE1 to LE4. In other words, it outputs the highest voltage (largest voltage) of total forward voltages VLD which are drop voltages in the element arrays LE1 to LE4.

The comparator 11 compares the output voltage of the LED voltage selector 10 with the second reference voltage VREF2 to output the comparison result to the logic circuit 12.

The logic circuit 12 receives the outputs of the comparator 11 and the comparator 16, generates a first control signal LSDET1 and a second control signal LSDET2 to be used in a second feedback control mode which will be described later, and outputs them to the drive amplifier 9.

The first control signal LSDET1 and the second control signal LSDET2 control switching of the switching element M1 via the drive amplifier 9 so that each of the voltages VLED1 to VLED4 of the LED connection terminals LED1 to LED4 does not decrease. The first control signal LSDET1 controls the start of switching in the second feedback control mode and the second control signal LSDET2 serves to allow switching of the switching element M1 in the second feedback control mode.

A third reference voltage VREF3 is connected to the inverting input terminal (−) of the comparator 16. The output of the comparator 16 is input to the logic circuit 12 which outputs the second control signal LSDET2. The second control signal LSDET2 is connected to the drive amplifier 9.

The comparator 16 compares the voltage of the LED voltage selector 10 with the third reference voltage VREF3 to output the result to the logic circuit 12. A part of switching in the second feedback control mode is controlled by the comparator 16.

Figure 2:
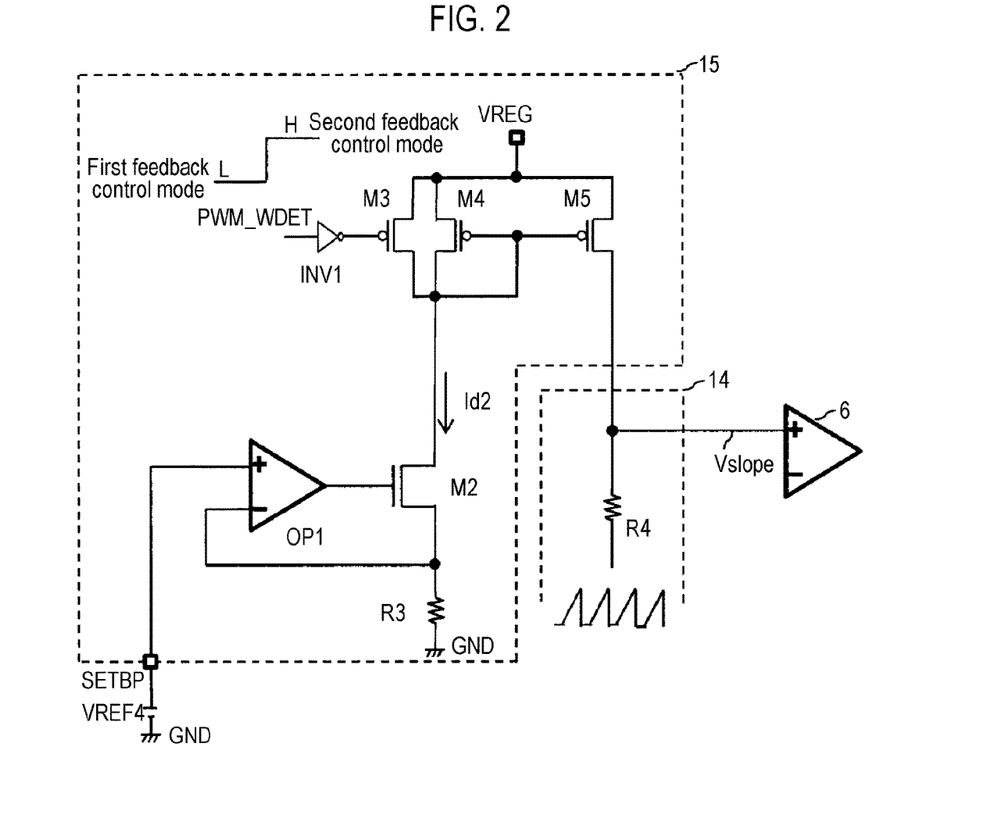
FIG. 2 is a circuit diagram illustrating a slope offset adjuster according to the present disclosure.

FIG. 2 illustrates the slope offset adjuster 15 and its peripheral circuit parts. In FIG. 2, the slope offset adjuster 15 includes an operational amplifier OP1, MOS transistors M2 to M5, a resistor R3, and an inverter circuit INV1.

An inverting input terminal (−) of the operational amplifier OP1 is connected to a source of the MOS transistor M2 and one end of the resistor R3, and the other end of the resistor R3 is connected to the ground potential GND. By incorporating the resistor R3 and a resistor R4 which will be described later, it is possible to eliminate the influence of the temperature characteristic.

One end of the voltage source VREF4 is connected to a non-inverting input terminal (+) of the operational amplifier OP1 via the voltage setting terminal SETBP, and the other end thereof is connected to the ground potential GND.

An output of the operational amplifier OP1 is connected to a gate of the MOS transistor M2, and a drain of the MOS transistor M2 is connected to a drain of the MOS transistor M3, a drain and a gate of the MOS transistor M4, and a gate of the MOS transistor M5. The MOS transistors M2, M4, and M5 constitute a well-known current mirror circuit. In the present disclosure, the MOS transistor M4 may be referred to as an input stage of the current mirror circuit, and the MOS transistor M5 may be referred to as an output stage of the current mirror circuit.

A dimming signal width detection signal PWM_WDET is connected to an input of the inverter circuit INV1, and an output of the inverter circuit INV1 is connected to a gate of the MOS transistor M3. An internal power source VREG is connected to the drains of the MOS transistors M2 to M4. Sources of the MOS transistors M3 to M5 are connected to the internal power source VREG. A drain of the MOS transistor M5 is connected to one end of the resistor R4 and the non-inverting input terminal (+) of the PWM comparator 6. A signal therein may be referred to as the slope voltage Vslope. The MOS transistor M3 serves as a switch for controlling an ON/OFF operation of the current mirror circuit.

Furthermore, the MOS transistors M2 to M5 may be configured as bipolar transistors instead of the MOS transistors. In the present disclosure, the gates of the MOS transistors or the bases of the bipolar transistor may be referred to as control electrodes, the sources of the MOS transistors or the emitters of the bipolar transistor may be referred to as first main electrodes, and the drains of the MOS transistors or the collectors of the bipolar transistors may be referred to as second main electrodes.

FIG. 2 will be specifically described in operation. The voltage source VREF4 is applied to the voltage setting terminal SETBP, and a drain current Id2 flowing through the MOS transistor M2 is determined by a voltage buffered by the operational amplifier OP1 and the resistor R3. The drain current Id2 is looped back by the current mirror circuit configured as the MOS transistors M4 and M5 and is converted into a voltage by the resistor R4. A DC potential of the slope voltage Vslope is shifted (moved) by the DC voltage generated at the resistor R4.

When the dimming signal width detection signal PWM_WDET has a low level L, i.e., in the first feedback control mode, the current mirror circuit including the MOS transistors M2, M4, and M5 validly functions by the MOS transistor M3, and the DC potential of the slope voltage Vslope is adjusted to a predetermined magnitude by a change in the voltage generated at the resistor R4 and output to the PWM comparator 6.

On the other hand, when the dimming signal width detection signal PWM_WDET has a high level H, i.e., in the second feedback control mode, the function of the current mirror circuit including the MOS transistors M2, M4, and M5 is stopped by the MOS transistor M3. Therefore, the DC potential of the slope voltage Vslope is output to the PWM comparator 6 without being changed in potential at the resistor R4.

Returning to FIG. 1, the description will be continued. The slope voltage Vslope is connected to the non-inverting input terminal (+) of the PWM comparator 6. The PWM comparator 6 compares the error voltage of the error amplifier 8 with the slope voltage Vslope to output the comparison result to the drive amplifier 9.

The drive amplifier 9 controls the gate of the switching element M1 via the switching terminal SWOUT of the LED driver IC 100 based on the comparison result of the PWM comparator 6.

A pulsed PWM signal is input from a signal source (not shown) to the terminal PWMIN of the LED driver IC 100. The input PWM signal passes through the Schmitt trigger 1 which generates a dimming signal PWM and inputs the same to the PWM width detector 2. The PWM width detector 2 measures an ON width of the input dimming signal PWM. When the measured value is equal to or greater than a threshold value, the PWM width detector 2 outputs a high level H, and when the measured value is less than the threshold value, it outputs a low level L as the dimming signal width detection signal PWM_WDET. The dimming signal width detection signal PWM_WDET is connected to the slope voltage control part 14, the switch SW1, and the switch SW2 to adjust Vslope and switch on or off each of the switch SW1 and the switch SW2.

The switching between the first feedback control mode and the second feedback control mode is controlled by the dimming signal width detection signal PWM_WDET. That is, when the ON width of the dimming signal PWM is less than the threshold value, the dimming signal width detection signal PWM_WDET has a low level L, the switch SW1 is turned on, and the switch SW2 is turned off, enabling the first feedback control mode. When the ON width of the dimming signal PWM is equal to or greater than the threshold value, the dimming signal width detection signal PWM_WDET has a high level H, the switch SW1 is turned off, and the switch SW2 is turned on, enabling the second feedback control mode.

When the switch SW1 is turned on and the switch SW2 is turned off, the feedback voltage Vfb is input to the error amplifier 8. Therefore, feedback control is performed in which the feedback voltage Vfb is used as a feedback signal, and the output voltage VOUT is controlled to have a predetermined magnitude with respect to the feedback voltage Vfb (first feedback control mode).

On the other hand, when the switch SW1 is turned off and the switch SW2 is turned on, the minimum voltage as viewed from the reference potential GND among the voltages VLED1 to VLED4 of the LED connection terminals LED1 to LED4 is input to the error amplifier 8. Therefore, the second feedback control mode is performed in which the voltages of the LED connection terminals LED1 to LED4 are used as feedback signals.

By combining the first feedback control mode and the second feedback control mode, the dimming of the element arrays LE1 to LE4 corresponding to a duty of the dimming signal PWM can be performed.

Figure 3:
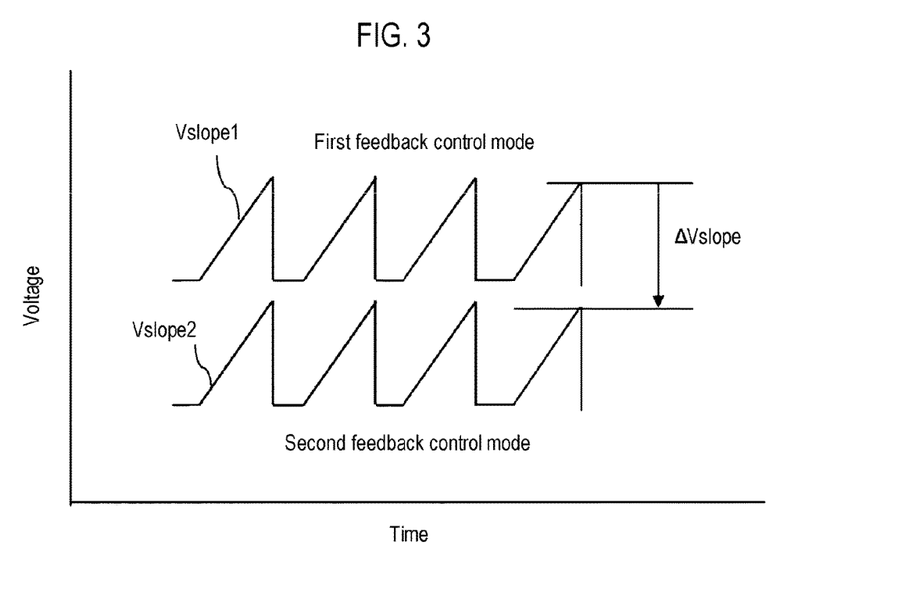
FIG. 3 is a diagram illustrating control and adjustment of a DC potential of a slope voltage Vslope adjusted by the slope offset adjuster according to the present disclosure.
Figure 4:
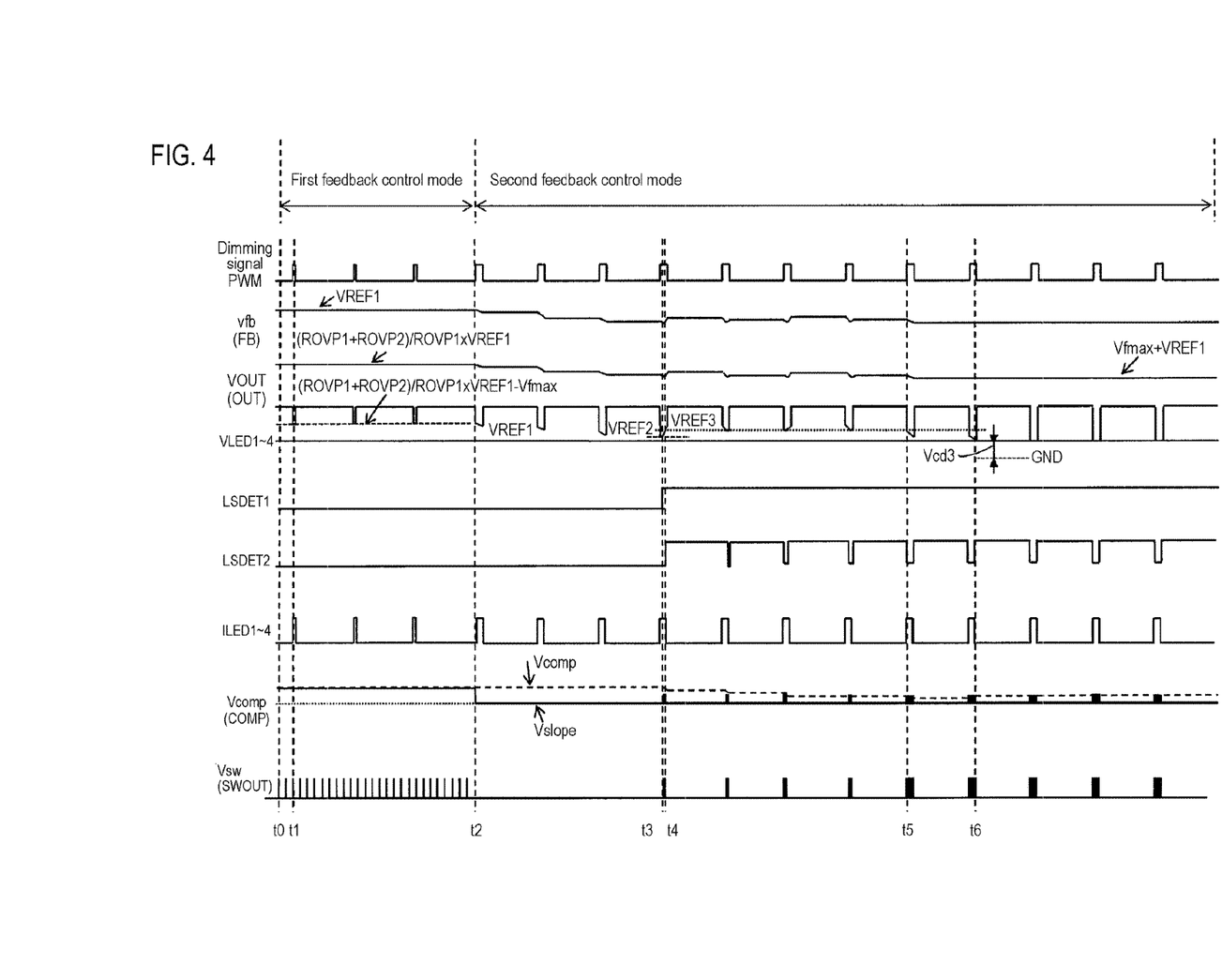
FIG. 4 is a timing chart when switching between a first feedback control mode and a second feedback control mode of the present disclosure.

FIG. 3 is a diagram illustrating how the DC potential of the slope voltage Vslope adjusted by the slope offset adjuster according to the present disclosure changes in the first feedback control mode and the second feedback control mode. A slope voltage Vslope1 indicates a DC potential in the first feedback control mode. A slope voltage Vslope2 indicates a DC potential in the second feedback control mode. A potential difference ΔVslope between the slope voltage Vslope1 and the slope voltage Vslope2 is, for example, about 0.5 V, and the setting and adjustment of the potential difference ΔVslope are performed by the slope offset adjuster 15 illustrated in FIG. 2. In an embodiment of the present disclosure, the DC potential of the slope voltage Vslope2 is kept at an initially set potential in the second feedback control mode, and the DC potential of the slope voltage Vslope1 is set to be higher than that of the slope voltage Vslope2 in the first feedback control mode. However, the foregoing is only an example of one set of design parameters, which may be appropriately changed depending on a circuit configuration of the slope voltage control part 14 and the slope offset adjuster 15 and a combination state thereof FIG. 4 is a timing chart when switching between the first feedback control mode and the second feedback control mode. Hereinafter, a description will be given with reference to FIGS. 1 to 3.

The dimming signal PWM indicates a state in which the ON width of the dimming signal PWM is less than a threshold value of the dimming signal width detection signal PWM_WDET (first feedback control mode) from time t0 to time t2, and indicates a state in which the ON width of the dimming signal PWM is equal to or greater than the threshold value of the dimming signal width detection signal PWM_WDET (second feedback control mode) after the time t2.

The feedback voltage Vfb is generated at the feedback terminal FB. It is controlled in the first feedback control mode from the time t0 to the time t2. After the time t2, the second feedback control mode in which the control of the feedback voltage Vfb is not adopted is performed.

The output voltage VOUT has a value expressed by the following equation from the time t0 to the time t2.

$$VOUT=(ROVP1+ROVP2)/ROVP1*VREF1$$

In the above equation, the resistor ROVP1 and the resistor ROVP 2 are external resistors of the feedback terminal FB, and the first reference voltage VREF1 is a voltage generated in the LED driver IC 100.

A period from the time t2 to the time t6 is a transient period before the output voltage VOUT is kept at a predetermined magnitude, and after the time t6, it has a value expressed by the following expression. Here, Vfmax indicates the largest light emitting element voltage VLD among the voltages of the element arrays LE1 to LE4.

$$VOUT=Vfmax+VREF1$$

The respective voltages VLED1 to VLED4 of the LED connection terminals LED1 to LED4 when the dimming signal PWM has a low level L are generated at the LED connection terminals LED1 to LED4 and are expressed by the following equation from the time t0 to the time t2.

$$VLED1 \text{ to } VLED4=(ROVP1+ROVP2)/ROVP1*VREF1$$

At the time t1 when the LED light emitting element light source LE is turned on, it is expressed by the following equation.

$$VLED1 \text{ to } VLED4=(ROVP1+ROVP2)/ROVP1*VREF1-Vfmax$$

The switching from the first feedback control mode to the second feedback control mode occurs at the time t2, and thereafter, the switching of switching element M1 at the switching terminal SWOUT of the LED driver IC 100 is stopped before each of the voltages VLED1 to VLED4 of the LED connection terminals LED1 to LED4 becomes equal to or lower than the second reference voltage VREF2. The second reference voltage VREF2 is set to be higher than the first reference voltage VREF1.

When each of the voltages VLED1 to VLED4 of the LED connection terminals LED1 to LED4 becomes equal to or lower than the second reference voltage VREF2 at the times t3 to t4, the switching of the switching element M1 at the switching terminal SWOUT of the LED driver IC 100 starts. At this time, since the voltage of the error amplifier output terminal COMP of the LED driver IC 100 is sufficiently higher than the slope voltage Vslope, the energy obtained per switching increases. Thus, each of the voltages VLED1 to VLED4 of the LED connection terminals LED1 to LED4 rapidly rises.

When each of the voltages VLED1 to VLED4 of the LED connection terminals LED1 to LED4 becomes equal to or higher than the third reference voltage VREF3 at the time t4, the switching of the switching element M1 is stopped.

Each of the voltages VLED1 to VLED4 of the LED connection terminals LED1 to LED4 is controlled such that the switching element M1 is switched when the dimming signal PWM has a high level H at or below the third reference voltage VREF3 at the times t4 to t5.

When each of the voltages VLED1 to VLED4 of the LED connection terminals LED1 to LED4 becomes equal to or lower than the third reference voltage VREF3 at the time t5, the switching of the switching element M1 starts, but each of the voltages VLED1 to VLED4 of the LED connection terminals LED1 to LED4 does not rise, unlike at the times t3 to t4. This is because the voltage of the terminal COMP of the LED driver IC 100 gradually decreases between the time t3 and the time t5 and the energy obtained per switching decreases since the voltage is only slightly higher than the slope voltage.

Each of the voltages VLED1 to VLED4 of the LED connection terminals LED1 to LED4 is controlled to become the first reference voltage VREF1 at the time t6. The minimum voltage of the voltages VLED1 to VLED4 of the LED connection terminals LED1 to LED4 is not lower than the first reference voltage VREF1 after the time t6, and the potential Vcd3 as seen from the ground potential GND becomes a potential substantively equal to the first reference voltage VREF1. The potential Vcd3 becomes sufficiently greater than the potential Vcd5 shown in FIG. 7. Therefore, since a sufficient voltage source is supplied to the constant current source 13, it is possible to eliminate generation of instantaneous flickering in the light emitting element light source LE. In order to prevent the minimum voltage of the voltages VLED1 to VLED4 of the LED connection terminals LED1 to LED4 from being equal to or lower than the first reference voltage VREF1, the adjustment of the DC potential of the slope voltage Vslope by the slope offset adjuster 15 and the switching control of the switching elements M1 by the second control signal LSDET2, which will be described later, are performed.

The first control signal LSDET1 is output from the logic circuit 12, and indicates a low level L from the time t0 to the time t3. When each of the voltages VLED1 to VLED4 of the LED connection terminals LED1 to LED4 becomes equal to or lower than the second reference voltage VREF2 at the time t3, it outputs a high level H. The first control signal LSDET1 is output when each of the voltages VLED1 to VLED4 of the LED connection terminals LED1 to LED4 after entering the second feedback control mode becomes equal to or lower than the second reference voltage VREF2. This is because the first control signal LSDET1 serves as an enable signal in the second feedback control mode. In the second feedback control mode, the LED driver IC 100 allows switching when the dimming signal PWM has a high level H, the first control signal LSDET1 has a high level H, and the second control signal LSDET2 as described hereinbelow has a low level L. Thus, the output voltage VOUT of the LED driver IC 100 is appropriately kept. Furthermore, the first control signal LSDET1 is generated when one of the voltages VLED1 to VLED4 of the LED connection terminals LED1 to LED4 becomes equal to or lower than the second reference voltage VREF2, but may be switched when the pulse width of the dimming signal PWM is changed from the threshold value, i.e., at the time t2.

The second control signal LSDET2 is output from the logic circuit 12, and indicates a low level L from the time t0 to the time t4. When each of the voltages VLED1 to VLED4 of the LED connection terminals LED1 to LED4 becomes equal to or higher than the third reference voltage VREF3 at the time t4, it outputs a high level H. The third reference voltage VREF3 is set slightly higher than the second reference voltage VREF2. Thus, it can be generated at the same timing as the first control signal LSDET1 at the latest. The second control signal LSDET2 may be generated in the first feedback control mode, i.e., from the time t0. In any case, the second control signal LSDET2 is enabled since the first control signal LSDET1 has a high level H and the second control signal LSDET2 has a low level L and thus the actual function comes after the time t3.

In addition, when the first control signal LSDET1 is set to a low level L at a timing of the time t2, which is a boundary with the first feedback control mode, at which the second feedback control mode starts, and when the second control signal LSDET2 is set to a low level L, the output voltage VOUT becomes high and flickering occurs in the light emitting element light source LE, which is not desirable. Therefore, in an embodiment of the present disclosure, the switching timing between the first feedback control mode and the second feedback control mode is when the pulse width of the dimming signal PWM reaches the threshold value, but the actual control of the light emitting element light source LE starts from the time when the timing has passed. In other words, the first control signal LSDET1 is disabled during a period before the minimum value of the voltages VLED1 to VLED4 of the LED connection terminals LED1 to LED4 reaches the first reference voltage VREF1.

The second control signal LSDET2 serves as an enable signal for switching the switching element M1 in the second feedback control mode. In the second feedback control mode, the LED driver IC 100 allows switching of the switching element M1 when the dimming signal PWM is high, the first control signal LSDET1 has a high level H, and the second control signal LSDET2 has a low level L. Thus, the output voltage VOUT of the LED driver IC 100 is appropriately kept.

The currents ILED1 to ILED4 are currents flowing through the LED connection terminals LED1 to LED4, respectively, and are stably supplied at all times.

The voltage Vcomp is generated at the terminal COMP, and at the time of operating in the first feedback control mode from the time t0 to the time t2, when the currents ILED1 to ILED4 of the connection terminals LED1 to LED4 are averaged, it is small and relatively low (close to the slope voltage) to switch synchronously with the dimming signal PWM.

The voltage Vcomp of the error amplifier output terminal COMP is kept as a voltage at which the error amplifier 8 goes to a high impedance state, before each of the voltage VLED1 to VLED4 of the LED connection terminals LED1 to LED4 becomes equal to or lower than the second reference voltage VREF2, at the time t2. However, unlike FIG. 7, the DC potential of the slope voltage Vslope is adjusted to a potential suitable for the second feedback control mode.

The voltage Vcomp of the error amplifier output terminal COMP decreases since the error amplifier 8 enters the normal operation when the first control signal LSDET1 has a high level H at the time t3.

Although the voltage Vcomp of the error amplifier output terminal COMP decreases at the times t4 to t5, since the slope voltage Vslope is lower than the voltage Vcomp, the voltage of the error amplifier output terminal COMP never becomes equal to or lower than the slope voltage. Therefore, when each of the voltages VLED1 to VLED4 of the LED connection terminals LED1 to LED4 is equal to or lower than the third reference voltage VREF3 and the dimming signal PWM has a high level H, the switching element M1 is always switched.

When each of the voltages VLED1 to VLED4 of the LED connection terminals LED1 to LED4 becomes equal to or lower than the third reference voltage VREF3 at the time t5, the switching of the switching element M1 starts, but each of the voltages VLED1 to VLED4 of the LED connection terminals LED1 to LED4 does not rise, unlike at the times t3 to t4. Because the voltage Vcomp of the error amplifier output terminal COMP of the LED driver IC 100 is only slightly higher than the slope voltage, the energy obtained per switching is reduced.

The voltage Vcomp of the error amplifier output terminal COMP of the LED driver IC 100 reaches a desired voltage at the time t6.

The switching voltage Vsw is output to the switching terminal SWOUT. It is switched off when the feedback terminal FB of the LED driver IC 100 exceeds the first reference voltage VREF1 when it operates in the first feedback control mode from the time t0 to the time t2 and is switched on when it is lower than the first reference voltage VREF1, which operates independently of the dimming signal PWM.

The pulse width of the dimming signal PWM is increased at the time t2, which causes switching from the first feedback control mode to the second feedback control mode. Each of the voltages VLED1 to VLED4 of the LED connection terminals LED1 to LED4 gradually decreases and the switching element M1 of the LED driver IC 100 is switched off before the voltage becomes equal to or lower than the second reference voltage VREF2.

The switching is started when each of the voltages VLED1 to VLED4 of the LED connection terminals LED1 to LED4 becomes equal to or lower than the third reference voltage VREF3 at the times t3 to t4.

When each of the voltages VLED1 to VLED4 of the LED connection terminals LED1 to LED4 becomes equal to or higher than the third reference voltage VREF3 at the time t4, the second control signal LSDET2 becomes a high level H and the switching element M1 of the LED driver IC 100 is switched off.

When each of the voltages VLED1 to VLED4 of the LED connection terminals LED1 to LED4 is equal to or lower than the third reference voltage VREF3 and the dimming signal PWM has a high level H after the time t4, the switching element M1 is always switched.

As a result of these operations, an appropriate voltage can be supplied to the constant current source 13, and there is no section where the LED driving current cannot be stably supplied. Thus, the problem of instantaneous flickering of the LED1 to the LED4 is eliminated.

Figure 5:
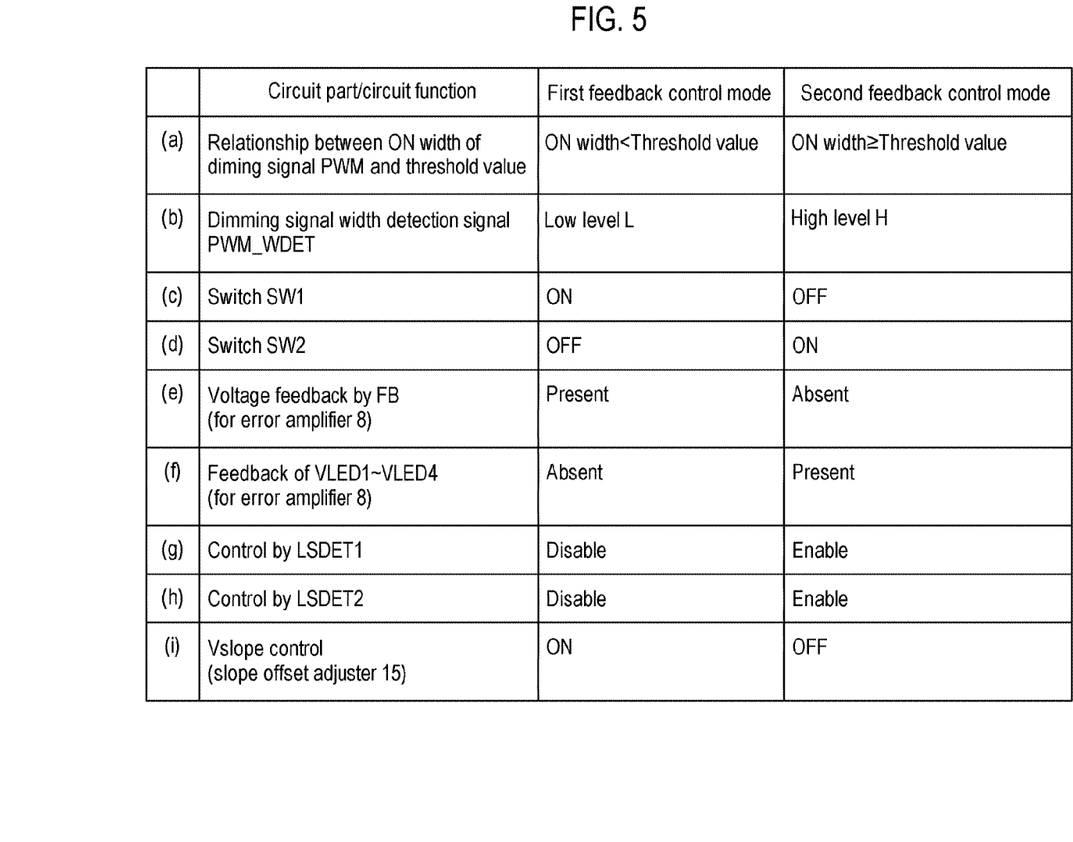
FIG. 5 is a diagram illustrating operating states of main circuit parts of FIG. 1 in the first feedback control mode and the second feedback control mode of the present disclosure.

FIG. 5 summarizes operating states of the main circuit parts when the light emitting element driving apparatus illustrated in FIG. 1 is driven in the first feedback control mode and the second feedback control mode. FIG. 5 also summarizes the key point of the above explanation. Hereinafter, the first feedback control mode and the second feedback control mode will be described in order.

The first feedback control mode is adopted when the ON width of the dimming signal PWM is smaller than a predetermined threshold value as shown in (a) of FIG. 5.

Which of the high level H and the low level L is set for the level of the dimming signal width detection signal PWM_WDET is illustrated in (b) of FIG. 5. In an embodiment of the present disclosure, it is set to the low level L. However, this is merely one of the design items, and either the high level H or the low level L is set to distinguish it from the second feedback control mode.

ON/OFF states of the switches SW1 and SW2 are illustrated in (c) and (d) of FIG. 5. In the first feedback control mode, the switch SW1 is set to "ON" and the switch SW2 is set to "OFF". The switch SW1 is prepared to transmit the feedback voltage Vfb to the error amplifier 8 and the switch SW2 is prepared to transmit one of the voltages VLED1 to VLED4 of the LED connection terminals LED1 to LED4 to the error amplifier 8.

Whether or not to control the output voltage VOUT based on the feedback voltage Vfb via the feedback terminal FB is illustrated in (e) of FIG. 5. Since the output voltage VOUT is controlled based on the feedback voltage Vfb via the error amplifier 8 as described above, the characteristic of the first feedback control mode is "present."

Whether each of the voltages VLED1 to VLED4 of the LED connection terminals LED1 to LED4 is fed back to the error amplifier 8 is illustrated in (f) of FIG. 5. Since the first feedback control mode does not return each of the voltages VLED1 to VLED4 of the LED connection terminals LED1 to LED4, it is "absent". A state in (f) of FIG. 5 is opposed to a state in (e) of FIG. 5.

FIG. 5, in (g) and (h), illustrates how to enable or disable an ON/OFF control of the switching element M1 via the drive amplifier 9 by the first control signal LSDET1 and the second control signal LSDET2 output from the logic circuit 12. Since such control operates in conjunction with the method of (f) of FIG. 5, it is "disable" in the first feedback control mode.

Whether or not to control and adjust the DC potential of the slope voltage Vslope is illustrated in (i) of FIG. 5. The control and adjustment of the slope voltage Vslope are related to ON/OFF of the slope offset adjuster 15. In an embodiment of the present disclosure, in the first feedback control mode, since the slope offset adjuster 15 is turned on and the DC potential of the slope voltage Vslope is controlled and adjusted, it is turned "on".

Next, the second feedback control mode will be described. In the second feedback control mode, since the operating states of the circuit parts shown in (a) to (i) of FIG. 5 are all set to the opposite states in the first feedback control mode, a detailed description thereof will be omitted.

In the second feedback control mode, as shown in (a) of FIG. 5, it is adopted when the ON width of the dimming signal PWM is equal to or greater than the threshold value. The second feedback control mode is a mode in which the light emitting element drop voltage VLD (each of the voltages VLED1 to VLED4 of the LED connection terminals LED1 to LED4) in the element arrays LE1 to LE4 is detected and the output voltage VOUT is controlled via the error amplifier 8. Therefore, the switch SW1 for transmitting the feedback voltage Vfb to the error amplifier 8 is turned "off" and the switch SW2 for transmitting the light emitting element drop voltage VLD to the error amplifier 8 is turned "on".

Since the combination of the first control signal LSDET1 and the second control signal LSDET2 is prepared to control ON/OFF of the element arrays LE1 to LE4, both are set to "enable" in the second feedback control. Furthermore, in an embodiment of the second feedback control mode, since the slope voltage Vslope is not controlled and adjusted, it is turned "off".

The control and adjustment of the slope voltage Vslope can also be used in both the first feedback control mode and the second feedback control mode. It is also possible to adjust the slope voltage Vslope in the second feedback control mode, not in the first feedback control mode. Selection of a configuration relating to the control and adjustment is one of the design items and may be appropriately changed depending on a circuit configuration of the slope offset adjuster 15.

As described above, the present disclosure can provide a light emitting element driving apparatus and a driving method thereof which greatly contribute to prevention of instantaneous flickering of an LED driving apparatus that is recently increasing in demand with a relatively simple circuit. Therefore, the present disclosure has very high industrial applicability.

According to the present disclosure in some embodiments, it is possible to prevent instantaneous flickering of an LED during luminance adjustment of the LED in a PWM control.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A light emitting element driving apparatus, comprising:
a current source configured to supply a current to each of a plurality of element arrays in which a plurality of light emitting elements are connected in series;
an error amplifier configured to generate an error signal based on a comparison of a first reference voltage with one of the highest voltage among total forward drop voltages of the plurality of element arrays, and a feedback voltage corresponding to a drive voltage supplied to the plurality of element arrays;
a first switch configured to perform an ON/OFF control to apply the feedback voltage to a first input terminal of the error amplifier or not to apply the feedback voltage to the first input terminal;
a second switch configured to perform an ON/OFF control to apply the highest voltage among the total forward drop voltages to a second input terminal of the error amplifier or not to apply the highest voltage to the second input terminal;
a slope voltage generating circuit configured to generate a slope voltage;
a PWM comparator configured to generate a pulse modulation signal having a duty ratio based on the slope voltage and the error signal;
a drive amplifier that is controlled by the pulse modulation signal output from the PWM comparator and drives a switching element configured to supply the drive voltage to the plurality of element arrays; and
a PWM width detector configured to detect a pulse width of the pulse modulation signal,
wherein the PWM width detector outputs a pulse width detection signal having different levels between when the pulse width of the pulse modulation signal is less than a predetermined threshold value and when the pulse width is equal to or greater than the threshold value, and switches ON/OFF of the first switch and the second switch based on the pulse width detection signal wherein the slope voltage generating circuit is controlled by a slope offset adjuster that is turned on or off by the pulse width detection signal, and wherein the DC potential of the slope voltage is adjusted depending on whether the slope offset adjuster is turned on or turned off.

2. The apparatus of claim 1, wherein when the pulse width of the pulse modulation signal is less than the threshold value, the first switch and the second switch are turned on and turned off, respectively, and when the pulse width of the pulse modulation signal is equal to or greater than the threshold value, the first switch and the second switch are turned off and turn on, respectively.

3. The apparatus of claim 1, wherein a DC potential of the slope voltage generated by the slope voltage generating circuit is switched depending on whether the pulse width of the pulse modulation signal is less than the threshold value or the pulse width is equal to or greater than the threshold value.

4. The apparatus of claim 1, wherein the current source is of a source current type that supplies a current from the drive voltage side to anode sides of the element arrays.

5. The apparatus of claim 1, wherein when the pulse width of the pulse modulation signal is less than the threshold value, the DC potential of the slope voltage is controlled to be higher than the DC potential when the pulse width of the pulse modulation signal is equal to or greater than the threshold value.

6. The apparatus of claim 1, wherein the slope offset adjuster comprises an operational amplifier, a transistor, a first resistor, and a current mirror circuit,
wherein a voltage source is connected to a non-inverting input terminal of the operational amplifier,
wherein a control electrode of the transistor is connected to an output terminal of the operational amplifier,
wherein an inverting input terminal of the operational amplifier is commonly connected to a first main electrode of the transistor,
wherein the first resistor is connected between the first main electrode of the transistor and a ground potential,
wherein an input stage of the current mirror circuit is connected to a second main electrode of the transistor,
wherein an output stage of the current mirror circuit is connected to one end of a second resistor,
wherein the other end of the second resistor is coupled to the slope voltage, and
wherein the DC potential of the slope voltage is dependent on a magnitude of a current flowing between the first main electrode and the second main electrode of the transistor.

7. The apparatus of claim 1, wherein the error amplifier, the PWM comparator, and the slope offset adjuster are incorporated in a single semiconductor integrated circuit (IC), and
wherein an output of the error amplifier is connected to one input terminal of the PWM comparator and led out to a first external terminal of the semiconductor integrated circuit.

8. The apparatus of claim 7, wherein a series connection body of a resistor and a capacitor, which are formed of separate parts, is connected between the first external terminal and a ground potential.

9. The apparatus of claim 3, further comprising:
a first comparator configured to output, as a first comparison output signal, a comparison of the highest voltage among the total forward drop voltages of the plurality of element arrays with a second reference voltage;
a second comparator configured to output, as a second comparison output signal, a comparison of the highest voltage with a third reference voltage; and
a logic part configured to respectively generate a first control signal and a second control signal for controlling ON/OFF of the switching element via the drive amplifier based on the first comparison output signal and the second comparison output signal.

10. The apparatus of claim 9, wherein the first control signal is enabled when the highest voltage among the total forward drop voltages of the plurality of element arrays exceeds the second reference voltage for the first time after the pulse width of the pulse modulation signal detected by the PWM width detector exceeds the threshold value,
wherein the second control signal is enabled each time the highest voltage exceeds the third reference voltage, and
wherein the switching of the switching element being allowed when both the first control signal and the second control signal are enabled.

11. The apparatus of claim 10, wherein a relationship of VREF1<VREF2<VREF3 is established among the first reference voltage, the second reference voltage, and the third reference voltage, wherein the first reference voltage is VREF1, the second reference voltage is VREF2 and the third reference voltage is VREF3.

12. The apparatus of claim 1, wherein the current source is of a sink current type provided between cathode sides of the element arrays and a ground potential.

13. The apparatus of claim 6, wherein the current mirror circuit is in an ON state when the pulse width of the pulse modulation signal is less than the threshold value, and is in an OFF state when the pulse width of the pulse modulation signal is equal to or greater than the threshold value.

14. A light emitting element driving apparatus, comprising:
a current source configured to supply a current to each of a plurality of element arrays in which a plurality of light emitting elements are connected in series;
an error amplifier configured to generate an error signal based on a comparison of a first reference voltage with one of the highest voltage among total forward drop voltages of the plurality of element arrays, and a feedback voltage corresponding to a drive voltage supplied to the plurality of element arrays;
a first switch configured to perform an ON/OFF control to apply the feedback voltage to a first input terminal of the error amplifier or not to apply the feedback voltage to the first input terminal;
a second switch configured to perform an ON/OFF control to apply the highest voltage among the total forward drop voltages to a second input terminal of the error amplifier or not to apply the highest voltage to the second input terminal;
a slope voltage generating circuit configured to generate a slope voltage;
a PWM comparator configured to generate a pulse modulation signal having a duty ratio based on the slope voltage and the error signal;
a drive amplifier that is controlled by the pulse modulation signal output from the PWM comparator and drives a switching element configured to supply the drive voltage to the plurality of element arrays;
a PWM width detector configured to:
detect a pulse width of the pulse modulation signal;
output a pulse width detection signal having different levels between when the pulse width of the pulse modulation signal is less than a predetermined threshold value and when the pulse width is equal to or greater than the threshold value; and
switch ON/OFF of the first switch and the second switch based on the pulse width detection signal; and
a slope offset adjuster that is turned on or off by the pulse width detection signal to control the slope voltage generating circuit.

15. The apparatus of claim 14, wherein a DC potential of the slope voltage generated by the slope voltage generating circuit is switched depending on whether the pulse width of the pulse modulation signal is less than the threshold value or the pulse width is equal to or greater than the threshold value.

16. The apparatus of claim 15, wherein the slope offset adjuster comprises an operational amplifier, a transistor, a first resistor, and a current mirror circuit,
   wherein a voltage source is connected to a non-inverting input terminal of the operational amplifier,
   wherein a control electrode of the transistor is connected to an output terminal of the operational amplifier,
   wherein an inverting input terminal of the operational amplifier is commonly connected to a first main electrode of the transistor,
   wherein the first resistor is connected between the first main electrode of the transistor and a ground potential,
   wherein an input stage of the current mirror circuit is connected to a second main electrode of the transistor,
   wherein an output stage of the current mirror circuit is connected to one end of a second resistor,
   wherein the other end of the second resistor is coupled to the slope voltage, and
   wherein the DC potential of the slope voltage is dependent on a magnitude of a current flowing between the first main electrode and the second main electrode of the transistor.

17. The apparatus of claim 14, wherein the error amplifier, the PWM comparator, and the slope offset adjuster are incorporated in a single semiconductor integrated circuit (IC), and
   wherein an output of the error amplifier is connected to one input terminal of the PWM comparator and led out to a first external terminal of the semiconductor integrated circuit.

18. The apparatus of claim 17, wherein a series connection body of a resistor and a capacitor, which are formed of separate parts, is connected between the first external terminal and a ground potential.

19. The apparatus of claim 14, further comprising:
   a first comparator configured to output, as a first comparison output signal, a comparison of the highest voltage among the total forward drop voltages of the plurality of element arrays with a second reference voltage;
   a second comparator configured to output, as a second comparison output signal, a comparison of the highest voltage with a third reference voltage; and
   a logic part configured to respectively generate a first control signal and a second control signal for controlling ON/OFF of the switching element via the drive amplifier based on the first comparison output signal and the second comparison output signal.

* * * * *